(12) United States Patent
Mittal et al.

(10) Patent No.: US 10,761,985 B2
(45) Date of Patent: Sep. 1, 2020

(54) HYBRID PRECISE AND IMPRECISE CACHE SNOOP FILTERING

(71) Applicant: Xilinx, Inc., San Jose, CA (US)

(72) Inventors: Millind Mittal, Saratoga, CA (US); Jaideep Dastidar, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 29 days.

(21) Appl. No.: 16/053,488

(22) Filed: Aug. 2, 2018

(65) Prior Publication Data
US 2020/0042446 A1 Feb. 6, 2020

(51) Int. Cl.
*G06F 12/0815* (2016.01)
*G06F 12/0831* (2016.01)

(52) U.S. Cl.
CPC ...... *G06F 12/0815* (2013.01); *G06F 12/0831* (2013.01); *G06F 2212/1032* (2013.01)

(58) Field of Classification Search
CPC .............. G06F 12/0831; G06F 12/0815; G06F 12/0833
See application file for complete search history.

(56) References Cited

U.S. PATENT DOCUMENTS

| 7,620,779 | B1 | 11/2009 | Klaiber | |
|---|---|---|---|---|
| 8,856,456 | B2 * | 10/2014 | Hendry | G06F 12/0831 711/146 |
| 2004/0003184 | A1 * | 1/2004 | Safranek | G06F 12/082 711/146 |
| 2013/0097385 | A1 * | 4/2013 | Beckmann | G06F 12/0817 711/128 |
| 2014/0095806 | A1 * | 4/2014 | Fajardo | G06F 12/0831 711/146 |
| 2015/0199290 | A1 * | 7/2015 | Mathewson | G06F 13/4068 710/110 |
| 2017/0255557 | A1 * | 9/2017 | Robinson | G06F 12/0831 |
| 2018/0004663 | A1 * | 1/2018 | Jalal | G06F 12/0831 |
| 2019/0073304 | A1 * | 3/2019 | Jiang | G06F 12/0815 |

OTHER PUBLICATIONS

Zebchuk, Jason, and Andreas Moshovos. "Regiontracker: A case for dual-grain tracking in the memory system." Technical report, Computer Group, University of Toronto (2006). (Year: 2006).*
Cantin, Jason F., et al. "Coarse-grain coherence tracking: RegionScout and region coherence arrays." IEEE Micro 26.1 (2006): 70-79. (Year: 2006).*

(Continued)

*Primary Examiner* — Charles Rones
*Assistant Examiner* — Hewy H Li
(74) *Attorney, Agent, or Firm* — Crawford Maunu PLLC (57) ABSTRACT

Circuits and methods for combined precise and imprecise snoop filtering. A memory and a plurality of processors are coupled to the interconnect circuitry. A plurality of cache circuits are coupled to the plurality of processor circuits, respectively. A first snoop filter is coupled to the interconnect and is configured to filter snoop requests by individual cache lines of a first subset of addresses of the memory. A second snoop filter is coupled to the interconnect and is configured to filter snoop requests by groups of cache lines of a second subset of addresses of the memory. Each group encompasses a plurality of cache lines.

17 Claims, 4 Drawing Sheets

(56) References Cited

OTHER PUBLICATIONS

Cantin, Jason F., Mikko H. Lipasti, and James E. Smith. "Improving multiprocessor performance with coarse-grain coherence tracking." ACM SIGARCH Computer Architecture News. vol. 33. No. 2. IEEE Computer Society, 2005. (Year: 2005).*

Ranganatiaan, Aanjhan et al., "Counting Stream Registers: An Efficient and Effective Snoop Filter Architecture," Jul. 16, 2012, pp. 1-8, IEEE, Piscataway, New Jersey, USA.

Ulfsnes, Rasmus, "Design of a Snoop Filter for Snoop Based Cache Coherency Protocols," Jun. 2013, pp. 1-120, Norwegian University of Science and Technology, Dept. of Electronics and Telecommunications, Trondheim, Norway.

Basu, "CMP Directory Coherence: One Granularity Does Not Fit All", CS Technical Reports, Jul. 11, 2013.

Zebchuk, "A Framework for Coarse-Grain Optimizations in the On-Chip Memory Hierarchy," Dec. 1, 2007.

\* cited by examiner

FIG. 4

HYBRID PRECISE AND IMPRECISE CACHE SNOOP FILTERING

TECHNICAL FIELD

The disclosure generally relates to cache snoop filtering.

BACKGROUND

Cache memories are employed in shared memory, multiprocessor data processing systems in order to improve performance. The time required to access data in the shared memory can be reduced by storing local copies of data in the cache memories. As the memory is shared amongst multiple processors, cache coherency schemes are necessary to ensure that each processor views and has access to the most recent shared data in the cache memories.

In a snoop-based cache coherency protocol, cache control circuitry at each processor monitors the memory bus for addresses cached in the local cache memory. When a cache control circuit detects a write to an address by another processor and that address is locally cached, the cache control circuit can mark the local copy as invalid. When a processor seeks access to an address that is cached and marked invalid, the cache control circuit fetches the up-to-date data.

Snoop requests can reduce system performance. Each cache control circuit broadcasts indications of cache line updates to all the other cache control circuits. In a system having N processors, the snoop traffic will be proportional to $N*(N-1)$. As a large number of cache lines may not be shared amongst the processors, much of the snoop traffic can be wasteful. The excess snoop traffic reduces the bandwidth available for accesses to the shared memory.

Cache control circuits can be implemented with snoop filters to reduce unnecessary snoop traffic. Generally, a snoop filter tracks which addresses are cached and filters requests that do not reference cached addresses. Furthermore, a snoop filter may also track which processors, or the number of processors that have requested copies of cacheable addresses and filter snoops not only to addresses that are cached, but also filter snoops to only the processors that have those tracked addresses cached. Cache filters are generally of two types: precise cache filters and imprecise cache filters. A precise snoop filter filters snoop requests by addresses of individual cache lines. An imprecise snoop filter filters snoop requests by addresses of groups of cache lines.

SUMMARY

A disclosed circuit arrangement includes interconnect circuitry, a memory coupled to the interconnect circuitry, and a plurality of processor circuits coupled to the interconnect circuitry. A plurality of cache circuits are coupled to the plurality of processor circuits, respectively. A first snoop filter is coupled to the interconnect circuitry and is configured to filter snoop requests by individual cache lines of a first subset of addresses of the memory. A second snoop filter is coupled to the interconnect circuitry and is configured to filter snoop requests by groups of cache lines of a second subset of addresses of the memory. Each group encompasses a plurality of cache lines.

A method includes caching cache lines of a memory in cache circuits of a plurality of processors. The method has a first snoop filter filtering snoop requests by individual cache lines of a first subset of addresses of the memory, and a second snoop filter filtering snoop requests by groups of cache lines of a second subset of addresses of the memory. Each group encompasses a plurality of cache lines.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Precise and imprecise snoop filtering schemes present a tradeoff between scale and accuracy. Precise Snoop Filters offer less scalability but provide accurate filtering. A precise snoop filter filters snoop requests by addresses of individual cache lines. Thus, snoop requests issued by the precise snoop filter are typically not spurious and only target the caching elements that are tracked. Precise snoop filters do not scale well as tradeoffs are required between the size of the snoop filter, the number of caching elements, as well as the cumulative size of the cache being tracked across all caching elements.

Imprecise snoop filters offer less accuracy but provide scalability. An imprecise snoop filter tracks the aggregate presence of cache states across a set of cache lines; the tracking is done at a coarser granularity than on a per cache line basis. Thus, imprecise snoop filters offer greater scalability as compared to precise snoop filters. As a particular cache line marked as having presence in an imprecise snoop filter may or may not be present across the caching elements being tracked, snoop requests issued by the imprecise snoop filter may be spurious. Imprecise snoop filters scale well, offering larger numbers of tracked caching elements and a larger cumulative size of the tracked cache size across the tracked caching elements.

The disclosed circuits and methods provide a hybrid snoop filter that provides the advantages of both precise and imprecise snoop filters. The hybrid snoop filter employs both a precise snoop filter and an imprecise snoop filter. In addition, circuitry is provided to modulate between finegrained precise tracking and coarse-grained imprecise tracking of cache states of multiple processing units for an optimal balance between precision and scale. The circuits and methods thereby avoid the disadvantages of approaches employing only precise snoop filtering or only imprecise snoop filtering.

The hybrid snoop filter is especially useful in multiprocessor systems having a memory that is shared amongst the processors and having interconnect circuitry providing point-to-point connection between the processors and shared memory and between the processors. Each of the processors has a local cache. A precise snoop filter filters snoop requests by addresses of individual cache lines, and an imprecise snoop filter filters snoop requests by addresses that encompass a group of cache lines. Disadvantages of each of precise and imprecise snoop filtering can be reduced by reassigning the tracking of cache lines between precise and imprecise snoop filters based on access patterns and capacities of the snoop filters.

Figure 1:
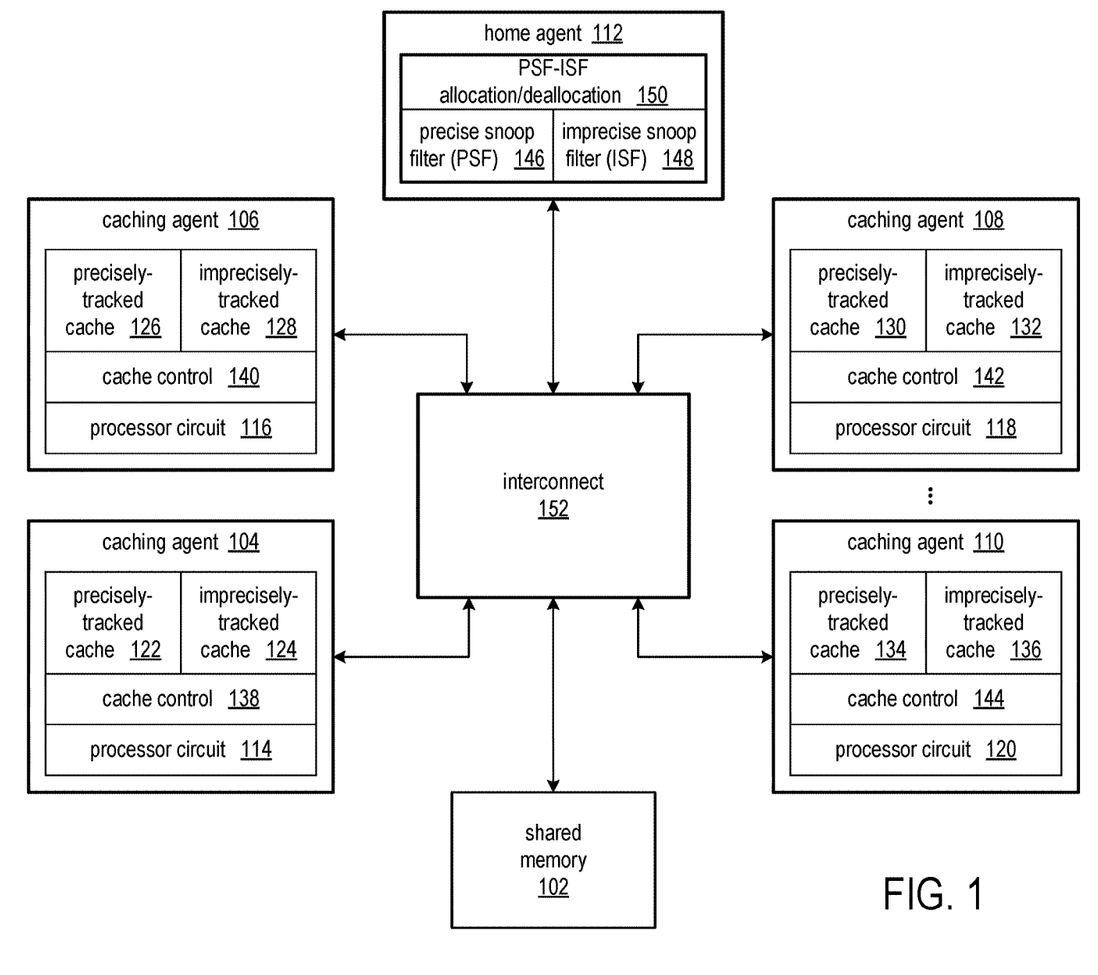
FIG. 1 illustrates an exemplary system having a shared memory and multiple caching agents having access to the shared memory.

FIG. 1 illustrates an exemplary system having a shared memory 102 and multiple caching agents 104, 106, 108, . . . 110 having access to the shared memory. Each caching agent includes processing circuitry that can access data in the shared memory and can locally store a copy of the data from the shared memory in local cache memory. In the exemplary system, the caching agents 104, 106, 108, . . . , 110 include processor circuits 114, 116, 118, and 120, respectively. Examples of processor circuits include central processing units (CPUs), graphics processing units (GPUs), digital signal processors (DSPs), circuits implemented in field programmable gate arrays (FPGAs), circuits implemented in application specific integrated circuits (ASICs), and various combinations of the aforementioned. The caching agents and shared memory 102 are coupled by interconnect circuitry such as a switch that provides point-to-point connections between components or a shared bus.

Each of the caching agents 104, 106, 108, . . . , 110 includes cache circuitry. The cache circuitry includes cache memory and cache control circuitry. The cache memory provides storage for data of cache lines, and can be set associative and include tags for the cache lines. The cache control circuits can include translation look-aside buffers (TLBs) and control for retrieving data from the local cache or from shared memory, writing data back to the shared memory, servicing external snoop requests and managing the cached data and cache state as a result of those snoop requests, managing available storage in the cache memory through a cache eviction algorithm, and invalidating cache lines in the cache, etc. The caching agents 104, 106, 108, and 110 include cache control circuits 138, 140, 142, and 144, respectively.

Though the precisely-tracked cache and imprecisely-tracked cache are shown as separate blocks in each of the caching agents, it will be recognized that the cache lines tracked precisely can be interleaved with cache lines tracked imprecisely in the cache memory. The precise snoop filter 146 tracks addresses of cache lines that are precisely tracked, and the imprecise snoop filter 148 tracks addresses of cache lines that are imprecisely tracked. Cache lines that are precisely tracked are tracked by addresses of individual cache lines. With imprecise snoop filtering, addresses of cache lines are tracked by group. For each cache line precisely tracked, the precise snoop filter stores an address of the cache line. For cache lines that are imprecisely tracked, the imprecise snoop filter stores a tag that maps to addresses of multiple cache lines. The subset of addresses of the shared memory that the precise snoop filter 146 tracks are illustrated as blocks 122, 126, 130, and 134 in the caching agents 104, 106, 108, and 110, respectively, and the subset of addresses of the shared memory that the imprecise snoop filter 148 tracks are illustrated as blocks 124, 128, 132, and 136 in the caching agents 104, 106, 108, and 110, respectively.

The precise snoop filter 146 and imprecise snoop filter 148, along with a control circuit 150, are hosted by a home agent 112 that is coupled to the interconnect 152. The home agent is a circuit that services coherent transactions amongst the caching agents. The home agent maintains the coherency for a given address space and need not be the memory controller circuit for main memory. Data and ownership responses as required by the flow of a given transaction are provided by the home agent.

The precise snoop filter (PSF) 146 filters snoop requests by addresses of individual cache lines. For an access to cache line A, the PSF controls transmitting snoop requests to those caching agents having cache line A in the local caches. The imprecise snoop filter (ISF) 148 filters snoop request by groups of cache lines. For an access to cache line A, the ISF controls transmitting snoop requests to those caching agents having cache lines that map to the same group as cache line A, including cache line A.

The control circuit 150 enforces allocation and deallocation and/or transitions between cache lines tracked by the PSF and groups of cache lines tracked by the ISF. A caching agent can potentially have a combination of precisely and imprecisely tracked cache lines, have all precisely-tracked cache lines, or have all imprecisely-tracked cache lines, depending on the historical access patterns of the cache lines. Different caching agents can have different allocations between precisely-tracked and imprecisely-tracked portions of cached addresses.

The control circuit 150 can reassign cache lines that are precisely tracked to a group that is imprecisely tracked, and can reassign a group that is imprecisely tracked to cache lines that are precisely tracked. Reassignment of tracking of a cache line from the PSF to the ISF can be in response to eviction of a cache line from the PSF to make room for a new cache line address. A new group can be added to the ISF to cover the evicted cache line. Reassignment of a cache line from the ISF to the PSF can be in response to policy choices, such as a referenced cache line being owned solely by one caching agent or temporal locality of references to the cache line addresses.

Other policy choices can include accesses to statically allocated address windows and accesses to dynamically determined address hotspots. A statically allocated address window can be a range of addresses in which performance-critical synchronization data structures are shared by multiple processors. Simultaneous requests for access or ownership to data in the window frequently occur and cache lines in the address range are suitable for management by the PSF.

Dynamically determined address hotspots can be identified through long-term monitoring of accesses to cache lines. As opposed to typical LRU based allocation, which covers the short term monitoring, address hotspot detection, and subsequent preferential allocation in PSF, is based on long-term determination of frequently accessed addresses or frequent contention for particular addresses.

Figure 2:
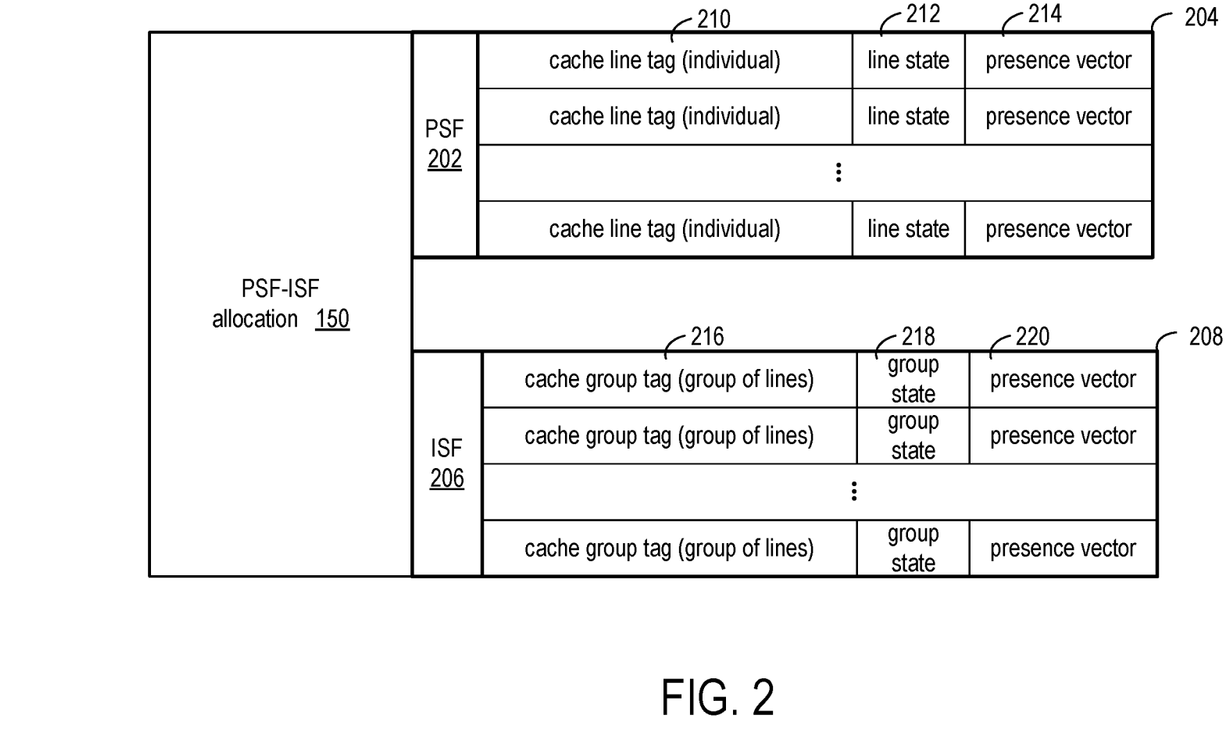
FIG. 2 shows a directory of precisely-tracked cache lines tracked by the precise snoop filter logic and a directory of imprecisely-tracked cache lines tracked by the imprecise snoop filter logic.

FIG. 2 shows a directory 204 of precisely-tracked cache lines tracked by the precise snoop filter logic 202 and a directory 208 of imprecisely-tracked cache lines tracked by the imprecise snoop filter logic 206. Directory 204 can be implemented as a memory circuit addressed by cache line tags, and directory 208 can be implemented as a memory circuit addressed by cache group tags.

Each entry in the directory 204 includes a cache line tag 210, a line state 212, and a presence vector 214. The cache line tag identifies the cache line that is tracked by the PSF logic 202 and described by the line state and the presence vector. The line state can indicate whether the referenced cache line is shared, held exclusively, valid, etc. The presence vector can be a group of bits in which each bit corresponds to a particular caching agent, and the state of the bit indicates whether the referenced cache line is cached by the caching agent.

Each entry in the directory 208 includes a cache group tag 216, a group state 218, and a presence vector 220. The cache group tag identifies a group of cache lines that are tracked by the ISF logic 206 and described by the group state and the presence vector. The group state can indicate whether any cache line of the group is shared, held exclusively, valid, etc. The presence vector can be a group of bits in which each bit corresponds to a particular caching agent, and the state of the bit indicates whether any cache line of the group is cached by the caching agent.

Each group state 218 can include an access count. The access count is incremented in response to an access by a caching agent to the associated cache group tag and is decremented in response to an eviction notification for a cache line referenced by the associated cache group tag. Maintaining access counts supports automatic eviction of a cache group tag from the ISF in response to the access count associated with the cache group tag being decremented to zero. Maintaining an access count allows tracking of multiple accesses to cache lines in the same cache group by the same caching agent. Without the access count, an eviction notification by one caching agent for one cache line in the cache group could not be acted upon because the presence vector must continue to be maintained for other cache lines of the cache group present in the cache of the caching agent.

Figure 3:
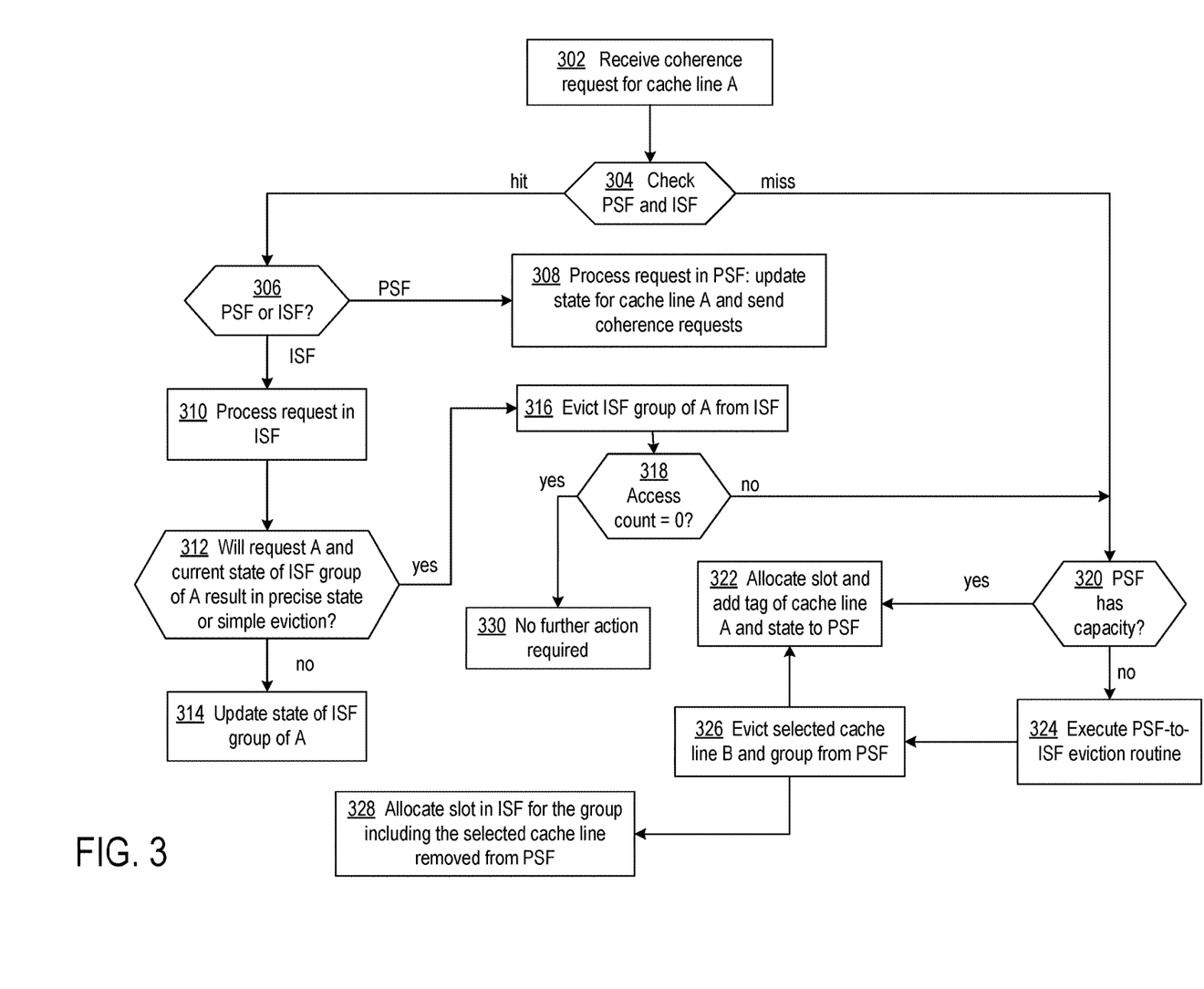
FIG. 3 shows a flowchart of a snoop filtering process that is a hybrid of precise snoop filtering and imprecise snoop filtering.

FIG. 3 shows a flowchart of a snoop filtering process that is a hybrid of precise snoop filtering and imprecise snoop filtering. The control circuit 150 performs various ones of the operations and coordinates other operations that are performed in the PSF 146 and ISF 148.

At block 302, the PSF-ISF allocation circuit receives a coherence request that references a particular cache line A, for example. Cache coherent requests include write requests and read requests. In addition to communicating whether the cache coherent request is a write or a read (or other type not classifiable as either a write or a read), the requests typically also communicate additional information based on request type and previous state of the cache line in other caches. For example, cache coherent requests can communicate that the caching agent writing the cache line has retained an exclusive (and therefore wants to perform future writes without communicating to other caches) or a shared copy. Another example is a cache coherent request that communicates that the caching agent reading the cache line wants to receive an exclusive (and therefore may want to perform future writes without communicating to other caches) or a shared copy.

At decision block 304, the control circuit 150 checks whether the referenced cache line A is present in either the PSF 146 or the ISF 148. Presence in the PSF can be determined by comparing the address of the cache line specified in the coherence request to the cache line tags in the PSF. Similarly, presence in the ISF can be determined by determining the group tag of the specified cache line address, and then determining if the determined group tag is present in the ISF. A hash function can be used to map cache line addresses to cache group tags.

Decision block 306 directs the process based on whether the cache address line is tracked in the PSF 146 or ISF 148. In response to the cache address line A being tracked in the PSF, at block 308 the control circuit 150 updates the state of cache line A in the PSF consistent with the coherence request and, if necessary, transmits coherence requests to cache controllers of the caching agents indicated in the presence vector associated with the cache line in the PSF. Cache coherence requests need not be sent for a shared group state and a shared read request where only the presence vector is updated.

In response to the cache line A belonging to a group of cache lines tracked in the ISF 148, at block 310 the allocation circuit transmits coherence requests to cache controllers of the caching agents indicated in the presence vector associated with the group tag in the ISF. However, there are combinations of cache group states in the ISF and the request type in which sending cache coherence requests to all processors having cache lines present in the group of cache line A is not necessary. For example, cache coherence requests need not be sent for a shared group state and a shared read request where only the presence vector is updated.

At decision block 312, the control circuit 150 determines whether the group to which cache line A belongs should be removed from the ISF 148 for purposes of adding cache line A to the PSF 146 or the group should be simply removed from the ISF. The determination can be based on application-specific policy choices. For example, some applications may require more accuracy and less scalability, which would lead to a policy that is less resistant to moves from the ISF to the PSF. Some applications may require greater scalability and less accuracy, which would lead to a policy that is more resistant to move from the ISF to the PSF. A simple exemplary indicator that can be used to trigger reassigning a cache line from the ISF to the PSF is a coherence request that specifies sole ownership of the cache line by a caching agent. A coherence request that specifies shared copies of a cache line would not trigger reassignment of the cache line from the ISF to the PSF. Similarly, if the control circuit determines from the cache coherence request that the cache line can only be present in a single owner and that also matches the owner count of 1 in the ISF, the group can be reassigned to the PSF. Another example is the control circuit determining from the type of the cache coherence request that the owner count of the cache line after processing the request will be 1. The owner count can be indicated by the number of bits set in the presence vector.

The policy can be made more or less restrictive by tracking the number of accesses to cache lines in a group and reassigning a group of cache lines from the ISF 148 to the PSF 146 when the number of accesses reaches a threshold number within a prescribed period of time (temporal locality). In response to determining that the cache line should not be reassigned to the PSF, at block 314 the control circuit updates the group state of the group of cache lines to which cache line A belongs. The state is based on the type of cache coherence request.

In response to determining that the cache line should be reassigned to the PSF 146 or simply evicted in response to the access count being decremented to zero at block 310, at block 316 the allocation circuit evicts the group of cache lines to which cache line A belongs from the ISF 148. In evicting the group of cache lines, the allocation circuit removes the group tag from the ISF. If the access count is zero, no further action is required, as shown by decision block 318 and block 330. Otherwise, if the access count is not equal to zero, decision block 318 directs the process to block 320 to begin adding all of the cache lines in the group to the PSF. As the states of the group of cache lines evicted from the ISF are applicable to all the cache lines in the group, the states of individual cache lines cannot be determined and thereby all the cache lines in the group are added to the PSF. The states of the group removed from the ISF are applied to each of the cache lines added to the PSF. A hash function can be used to map cache lines to a group tag, and the inverse of the hash function can be used to generate the full cache line address for the reassignment.

The efficiency of transitioning from the ISF 148 to the PSF 146 can be improved by sending state-query snoops for all the cache lines in the cache group to the owners indicated by the presence vector. Thus, only those cache lines that are still present in any of the caching agents are tracked in the PSF. Furthermore, the updated cumulative cache state across the caching agents can also then be tracked in the PSF. The overall effect of the state-query snoops is to regain preciseness of location and state in the PSF.

The processing of blocks 320, 322, 324, 326, and 328 can be performed for each cache line added to the PSF 146 from the group evicted from the ISF 148. Similarly, processing of blocks 320, 322, 324, 326, and 328 may be performed in the case that neither the ISF nor the PSF is tracking the referenced cache line as determined at decision block 304.

At decision block 320, the control circuit 150 determines if the PSF 146 has space available for the evicted cache lines or for the missed cache line determined at decision block 304. The directory 204 has storage space for a maximum number of cache line tags and states. If space is available, at block 322 the control circuit assigns a slot in the PSF directory to the cache line and updates the tag, cache line state, and presence vector accordingly.

If space is not available in the PSF 146 for the cache line, at block 324 the control circuit commences execution of eviction processing for making space for the cache line in the PSF directory and reassigning cache lines from the PSF to the ISF 148. At block 326, the control circuit selects a cache line for eviction from the PSF, such as a least recently accessed cache line, and determines all cache lines in the PSF that belong to the same group as the cache line selected for eviction. Cache lines that belong to the same group are also evicted.

In evicting the cache lines from the PSF 146, the tag, state, and presence information of the cache lines is read before the processing of blocks 322 and 328 in order to preserve the information for adding to the ISF 148. At block 328, the control circuit allocates a slot in the ISF for the group of cache lines including the cache line selected for eviction. Also, at block 328 the control circuit stores the aggregated cache state (a logic OR of the cache line states in the group) and presence vectors of the cache lines selected for eviction in the allocated slot in the ISF. Processing performance associated with creation of cache line groups and evictions is improved by using a hash function to map cache lines to cache group tags. Evictions of cache lines from the PSF to the ISF can thereby reduce spatial and/or temporal relationships between the cache lines in a group. At block 322, the control circuit adds the cache line to the PSF as described above.

Figure 4:
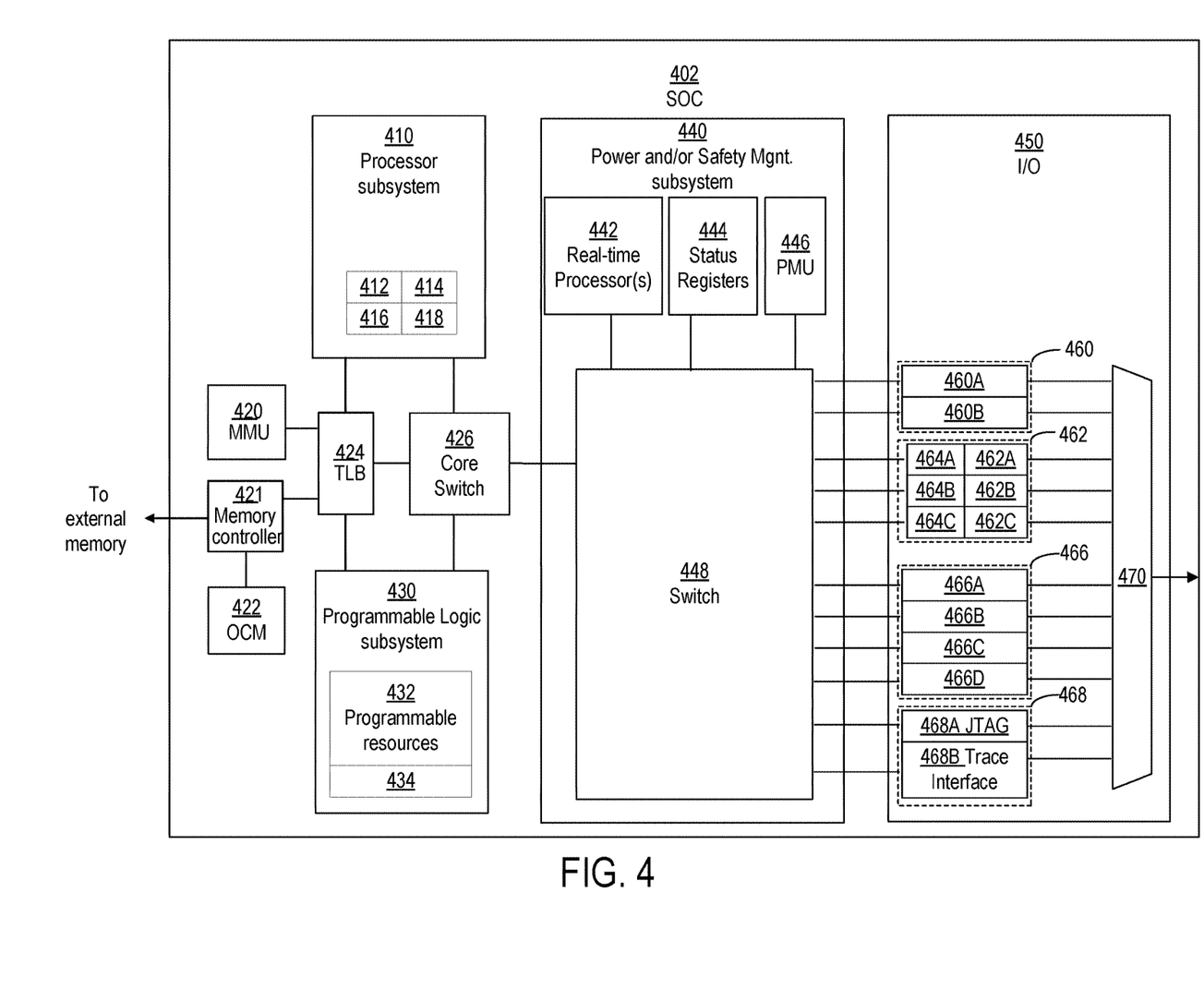
FIG. 4 shows an exemplary programmable IC that can be configured in accordance with the disclosed method and circuits.

FIG. 4 shows an exemplary programmable IC 402 that can be configured in accordance with the disclosed method and circuits. The programmable IC may also be referred to as a System On Chip (SOC), which includes a processor subsystem 410 and a programmable logic subsystem 430. The processor subsystem 410 may be programmed to implement a software portion of the user design, via execution of a user program. The program may be specified as part of a configuration data stream or may be retrieved from an on-chip or off-chip data storage device. The processor subsystem 410 may include various circuits 412, 414, 416, and 418 for executing one or more software programs. The circuits 412, 414, 416, and 418 may include, for example, one or more processor cores, floating point units (FPUs), an interrupt processing unit, on chip-memory, memory caches, and/or cache coherent interconnect.

The programmable logic subsystem 430 of the programmable IC 402 may be programmed to implement a hardware portion of a user design. For instance, the programmable logic subsystem may include a number of programmable resources 432, which may be programmed to implement a set of circuits specified in a configuration data stream. The programmable resources 432 include, for example, programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 432 may be programmed by loading a configuration data stream into the configuration memory cells, which define how the programmable interconnect circuits and programmable logic circuits are configured. For example, setting a configuration memory cell for a configurable latch to a first value may direct the configurable latch to operate as a single-edge-driven latch. Setting the configuration memory cell to a second value may direct the configurable latch to operate as a double-edge-driven latch. The collective states of the individual memory cells then determine the function of the programmable resources 432. The configuration data can be read from memory (e.g., from an external PROM) or written into the programmable IC 402 by an external device. In some implementations, a configuration controller 434 included in the programmable logic subsystem 430 may program the programmable resources, in response to powering on the programmable IC, by retrieving configuration data from a non-volatile memory coupled to the programmable IC and loading the configuration data into the configuration memory cells. In some other implementations, the configuration data may be loaded into the configuration memory cells by a start-up process executed by the processor subsystem 410.

The programmable IC 402 may include various circuits to interconnect the processor subsystem 410 with circuitry implemented within the programmable logic subsystem 430. In this example, the programmable IC 402 includes a core switch 426 that can route data signals between various data ports of the processor subsystem 410 and the programmable logic subsystem 430. The core switch 426 may also route data signals between either of the programmable logic or processing subsystems 410 and 430 and various other circuits of the programmable IC, such as an internal data bus. Alternatively or additionally, the processor subsystem 410 may include an interface to directly connect with the programmable logic subsystem—bypassing the core switch 426. Such an interface may be implemented, for example, using the AMBA AXI Protocol Specification (AXI) as published by ARM.

In some implementations, the processor subsystem 410 and the programmable logic subsystem 430 may also read or write to memory locations of an on-chip memory 422 or off-chip memory (not shown) via memory controller 421. The memory controller 421 can be implemented to communicate with one or more different types of memory circuits including, but not limited to, Double Data Rate (DDR) 2, DDR3, Low Power (LP) DDR2 types of memory, whether 16-bit, 32-bit, 16-bit with ECC, etc. The list of different memory types with which memory controller 421 is able to communicate is provided for purposes of illustration only and is not intended as a limitation or to be exhaustive. As shown in FIG. 4, the programmable IC 402 may include a memory management unit 420 and translation look-aside buffer 424 to translate virtual memory addresses used by the subsystems 410 and 430 to physical memory addresses used by the memory controller 421 to access specific memory locations.

The programmable IC may include an input/output (I/O) subsystem 450 for communication of data with external circuits. The I/O subsystem 450 may include various types of I/O devices or interfaces including for example, flash memory type I/O devices, higher performance I/O devices, lower performance interfaces, debugging I/O devices, and/or RAM I/O devices.

The I/O subsystem 450 may include one or more flash memory interfaces 460 illustrated as 460A and 460B. For example, one or more of flash memory interfaces 460 can be implemented as a Quad-Serial Peripheral Interface (QSPI) configured for 4-bit communication. One or more of flash memory interfaces 460 can be implemented as a parallel 8-bit NOR/SRAM type of interface. One or more of flash memory interfaces 460 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 450 can include one or more interfaces 462 providing a higher level of performance than flash memory interfaces 460. Each of interfaces 462A-462C can be coupled to a DMA controller 464A-464C respectively. For example, one or more of interfaces 462 can be implemented as a Universal Serial Bus (USB) type of interface. One or more of interfaces 462 can be implemented as a gigabit Ethernet type of interface. One or more of interfaces 462 can be implemented as a Secure Digital (SD) type of interface.

The I/O subsystem 450 may also include one or more interfaces 466 such as interfaces 466A-466D that provide a lower level of performance than interfaces 462. For example, one or more of interfaces 466 can be implemented as a General Purpose I/O (GPIO) type of interface. One or more of interfaces 466 can be implemented as a Universal Asynchronous Receiver/Transmitter (UART) type of interface. One or more of interfaces 466 can be implemented in the form of a Serial Peripheral Interface (SPI) bus type of interface. One or more of interfaces 466 can be implemented in the form of a Controller-Area-Network (CAN) type of interface and/or an inter-integrated circuit ($I^2C$) type of interface. One or more of interfaces 466 also can be implemented in the form of a timer type of interface.

The I/O subsystem 450 can include one or more debug interfaces 468 such as processor JTAG (PJTAG) interface 468A and a trace interface 468B. PJTAG interface 468A can provide an external debug interface for the programmable IC 402. Trace interface 468B can provide a port to receive debug, e.g., trace, information from the processor subsystem 410 or the programmable logic subsystem 430.

As shown, each of interfaces 460, 462, 466, and 468 can be coupled to a multiplexer 470. Multiplexer 470 provides a plurality of outputs that can be directly routed or coupled to external pins of the programmable IC 402, e.g., balls of the package within which the programmable IC 402 is disposed. For example, I/O pins of programmable IC 402 can be shared among interfaces 460, 462, 466, and 468. A user can configure multiplexer 470, via a configuration data stream to select which of interfaces 460-468 are to be used and, therefore, coupled to I/O pins of programmable IC 402 via multiplexer 470. The I/O subsystem 450, may also include a fabric multiplexer I/O (FMIO) interface (not shown) to connect interfaces 460-468 to programmable logic circuits of the programmable logic subsystem. Additionally or alternatively, the programmable logic subsystem 430 can be configured to implement one or more I/O circuits within programmable logic. In some implementations, the programmable IC 402 may also include a subsystem 440 having various circuits for power and/or safety management. For example, the subsystem 440 may include a power management unit 446 configured to monitor and maintain one or more voltage domains used to power the various subsystems of the programmable IC 402. In some implementations, the power management unit 446 may disable power of individual subsystems, when idle, to reduce power consumption, without disabling power to subsystems in use.

The subsystem 440 may also include safety circuits to monitor the status of the subsystems to ensure correct operation. For instance, the subsystem 440 may include one or more real-time processors 442 configured to monitor the status of the various subsystems (e.g., as indicated in status registers 444). The real-time processors 442 may be configured to perform a number of tasks in response to detecting errors. For example, for some errors, the real-time processors 442 may generate an alert in response to detecting an error. As another example, the real-time processors 442 may reset a subsystem to attempt to restore the subsystem to correct operation. The subsystem 440 includes a switch network 448 that may be used to interconnect various subsystems. For example, the switch network 448 may be configured to connect the various subsystems 410, 430, and 440 to various interfaces of the I/O subsystem 450. In some applications, the switch network 448 may also be used to isolate the real-time processors 442 from the subsystems that are to be monitored. Such isolation may be required by certain application standards (e.g., IEC-61508 SIL3 or ISO-26262 standards) to ensure that the real-time processors 442 are not affected by errors that occur in other subsystems.

Though aspects and features may in some cases be described in individual figures, it will be appreciated that features from one figure can be combined with features of another figure even though the combination is not explicitly shown or explicitly described as a combination.

The disclosed methods and systems are thought to be applicable to a variety of systems for filtering cache coherence snoop requests. Other aspects and features will be apparent to those skilled in the art from consideration of the specification. The methods and systems may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
   interconnect circuitry;
   a memory coupled to the interconnect circuitry;
   a plurality of processor circuits coupled to the interconnect circuitry;
   a plurality of cache circuits coupled to the plurality of processor circuits, respectively;
   a first snoop filter coupled to the interconnect and configured to filter snoop requests by individual cache lines of a first subset of addresses of the memory;
   a second snoop filter coupled to the interconnect and configured to filter snoop requests by groups of cache lines of a second subset of addresses of the memory, wherein each group encompasses a plurality of cache lines; and
   a control circuit coupled to the first snoop filter and to the second snoop filter, wherein the control circuit is configured to:
      reassign a group of cache lines filtered by the second snoop filter to cache lines filtered by the first snoop filter, wherein reassignment includes evicting the group of cache lines from the second snoop filter and adding the plurality of cache lines of the group to the first snoop filter;
      determine an owner count of a first group of cache lines filtered by the second snoop filter; and
      reassign cache lines of the first group of cache lines from the second snoop filter to the first snoop filter in response to the owner count of the first group being equal to 1 and an access count of the first group being greater than zero.

2. The circuit arrangement of claim 1, wherein the control circuit is further configured to select the group of cache lines for reassignment to the first snoop filter based on temporal locality of references to the group of cache lines.

3. The circuit arrangement of claim 1, wherein the control circuit is further configured to select the group of cache lines for reassignment to the first snoop filter based on sole ownership of a cache line in the group of cache lines.

4. The circuit arrangement of claim 1, wherein the control circuit is further configured to select the group of cache lines for reassignment to the first snoop filter based on determining a frequently accessed cache line in the group of cache lines.

5. The circuit arrangement of claim 1, wherein the control circuit is further configured to:
   determine cache lines that belong to the group selected for reassignment; and
   reassign the cache lines that belong to the group to the first snoop filter.

6. The circuit arrangement of claim 1, wherein the control circuit is further configured to reassign a first cache line from the first snoop filter to a first group filtered by the second snoop filter.

7. The circuit arrangement of claim 6, wherein the control circuit is further configured to:
   determine cache lines filtered by the first snoop filter that belong to the first group;
   aggregate cache line states of the cache lines that belong to the first group into a group state;
   store the group state in association with a tag of the first group; and
   remove the cache lines in the first group from the first snoop filter.

8. The circuit arrangement of claim 6, wherein the control circuit is further configured to reassign the first cache line from the first snoop filter to the first group filtered by the second snoop filter in response to a directory of the first snoop filter being full.

9. The circuit arrangement of claim 6, wherein the control circuit is further configured to select the first cache line to be reassigned from the first snoop filter to the first group filtered by the second snoop filter based on the first cache line being least recently used.

10. The circuit arrangement of claim 1 wherein:
    the first snoop filter includes a first memory configured for storage of a plurality of cache line tags of individual cache lines; and
    the second snoop filter includes a second memory configured for storage of a plurality of group tags associated with groups of caches lines, respectively, wherein each group tag maps to plurality of cache lines.

11. A method comprising:
    caching cache lines of a memory in cache circuits of a plurality of processors;
    filtering by a first snoop filter, snoop requests by individual cache lines of a first subset of addresses of the memory;
    filtering by a second snoop filter, snoop requests by groups of cache lines of a second subset of addresses of the memory, wherein each group encompasses a plurality of cache lines;
    reassigning by a control circuit, a group of cache lines filtered by the second snoop filter to cache lines filtered by the first snoop filter, wherein the reassigning includes evicting the group of cache lines from the second snoop filter and adding the plurality of cache lines of the group to the first snoop filter;
    determining by the control circuit, an owner count of a first group of cache lines filtered by the second snoop filter; and
    reassigning cache lines of the first group of cache lines from the second snoop filter to the first snoop filter by the control circuit in response to the owner count of the first group being equal to 1 and an access count of the first group being greater than zero.

12. The method of claim 11, further comprising, selecting by the control circuit, the group of cache lines for reassignment to the first snoop filter based on temporal locality of references to the group of cache lines.

13. The method of claim 11, further comprising, selecting by the control circuit, the group of cache lines for reassignment to the first snoop filter based on sole ownership of a cache line in the group of cache lines.

14. The method of claim 11, further comprising, selecting by the control circuit, the group of cache lines for reassignment to the first snoop filter based on determining a frequently accessed cache line in the group of cache lines.

15. The method of claim 11, further comprising:
    determining cache lines that belong to the group selected for reassignment; and
    reassigning the cache lines that belong to the group to the first snoop filter.

16. The method of claim 11, further comprising reassigning a first cache line from the first snoop filter to a first group filtered by the second snoop filter.

17. The method of claim 16, further comprising:
    determining cache lines filtered by the first snoop filter that belong to the first group;
    aggregating cache line states of the cache lines that belong to the first group into a group state;
    storing the group state in association with a tag of the first group; and removing the cache lines in the first group from the first snoop filter.

\* \* \* \* \*